US009509343B2

(12) United States Patent
Mujtaba et al.

(10) Patent No.: US 9,509,343 B2
(45) Date of Patent: *Nov. 29, 2016

(54) ANTENNA SWITCHING SYSTEM WITH ADAPTIVE SWITCHING CRITERIA

(71) Applicant: Apple Inc., Cupertino, CA (US)

(72) Inventors: Syed A. Mujtaba, Santa Clara, CA (US); Kee-Bong Song, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/962,084

(22) Filed: Dec. 8, 2015

(65) Prior Publication Data

US 2016/0094250 A1 Mar. 31, 2016

Related U.S. Application Data

(63) Continuation of application No. 14/645,501, filed on Mar. 12, 2015, now Pat. No. 9,215,000, which is a continuation of application No. 13/195,761, filed on Aug. 1, 2011, now Pat. No. 9,002,283.

(51) Int. Cl.
*H04B 1/00* (2006.01)
*H04W 64/00* (2009.01)
(Continued)

(52) U.S. Cl.
CPC ............. *H04B 1/0064* (2013.01); *G01S 19/13* (2013.01); *H04B 1/1027* (2013.01); *H04B 7/082* (2013.01);
(Continued)

(58) Field of Classification Search
CPC .. H04B 7/0617; H04B 7/0814; H04B 7/086; H04B 7/0808; H04B 7/0834; H04B 1/0064; H04B 1/1027; H04B 7/082; H04B 64/006; H04B 88/06; H04W 24/00; G01S 19/13
See application file for complete search history.

(56) References Cited

U.S. PATENT DOCUMENTS 6,067,449 A 5/2000 Jager
6,330,433 B1 * 12/2001 Jager .................... H04B 7/0808
455/135
(Continued)

FOREIGN PATENT DOCUMENTS

EP 0741466 A2 11/1996
EP 0 798 878 A2 10/1997
(Continued)

OTHER PUBLICATIONS

International Search Report and Written Opinion in Application No. PCT/US2012/048838, issued Oct. 8, 2012, pp. 1-13.
(Continued)

*Primary Examiner* — Lewis West
(74) *Attorney, Agent, or Firm* — Meyertons, Hood, Kivlin, Kowert & Goetzel, P.C.

(57) ABSTRACT

Apparatuses may be provided that contain wireless communications circuitry. The wireless communications circuitry may include radio-frequency transceiver circuitry coupled to multiple antennas. Signal strength measurements may be gathered using the antennas and corresponding signal strength difference measurements may be produced to reflect which of the antennas is exhibiting superior performing. Information may be gathered relating to the fading environment of the communications circuitry, such as whether the wireless communications circuitry is transitioning between a fast fading environment and a slow fading environment. For example, the wireless communications circuitry may further include a satellite positioning system receiver or an accelerometer, which may be used in gathering the information. The difference measurements may be filtered and compared to antenna switching criteria such as antenna switching thresholds. An antenna switching threshold may be adjusted in real time based at least in part on the gathered information.

20 Claims, 8 Drawing Sheets

(51) Int. Cl.
  *H04B 1/10* (2006.01)
  *H04B 7/08* (2006.01)
  *G01S 19/13* (2010.01)
  *H04W 88/06* (2009.01)

(52) U.S. Cl.
  CPC ......... *H04B 7/0808* (2013.01); *H04W 64/006* (2013.01); *H04B 7/0834* (2013.01); *H04W 88/06* (2013.01)

(56) References Cited

U.S. PATENT DOCUMENTS

| | | |
|---|---|---|
| 7,245,950 B2 | 7/2007 | Iwai et al. |
| 8,159,967 B2 | 4/2012 | Cho et al. |
| 2001/0046873 A1 | 11/2001 | Komatsu |
| 2002/0137536 A1 | 9/2002 | Aisaka et al. |
| 2004/0110524 A1 | 6/2004 | Takano et al. |
| 2004/0264610 A1 | 12/2004 | Marro et al. |
| 2005/0181736 A1 | 8/2005 | Cao et al. |
| 2005/0201482 A1* | 9/2005 | Iwasaki ............... H04B 7/0857 375/267 |
| 2008/0102873 A1 | 5/2008 | Kumar |
| 2008/0151798 A1 | 6/2008 | Camp |
| 2009/0175383 A1 | 7/2009 | Cho et al. |

FOREIGN PATENT DOCUMENTS

| | | |
|---|---|---|
| EP | 1643661 A2 | 4/2006 |
| GB | 2 347 591 A | 9/2000 |
| JP | H03104330 A | 5/1991 |
| JP | H08107378 A | 4/1996 |
| TW | 201004236 A | 1/2010 |
| WO | 9513670 A1 | 5/1995 |
| WO | 96/37966 A1 | 11/1996 |
| WO | 0150803 A1 | 7/2001 |

OTHER PUBLICATIONS

Notice of Allowance from Japanese Application No. 2014-524012, issued May 12, 2015, Japanese version, pp. 1-4.
Office Action from Taiwanese Application No. 101127694, issued May 12, 2015, Chinese version, pp. 1-6.
Notice of Allowance from Korean Application No. 10-2014-7005110, issued May 20, 2015, Korean version, pp. 1-3.
U.S. Appl. No. 13/195,761, filed Aug. 1, 2011, Syed A. Majtaba.
Notice of Preliminary Rejection from Korean Application No. 10-2014-7005110, issued Jan. 27, 2015, English and Korean versions, pp. 1-10.
Office Action from Japanese Application No. 2014524012, issued Jan. 26, 2015, English and Japanese versions, pp. 1-5.
Office Action, Chinese Application No. 201280044039.2, mailed Jan. 26, 2016, 16 pages.

* cited by examiner

ANTENNA SWITCHING SYSTEM WITH ADAPTIVE SWITCHING CRITERIA

CONTINUATION DATA

This application is a continuation of U.S. patent application Ser. No. 14/645,501, filed Mar. 12, 2015, and entitled "Antenna Switching System with Adaptive Switching Criteria," which is a continuation of U.S. Pat. No. 9,002,283, filed Aug. 1, 2011, having the same title, both of which are incorporated herein by reference in their entirety as though fully and completely set forth herein.

This relates generally to wireless communications circuitry, and more particularly, to electronic devices that have wireless communications circuitry with multiple antennas.

Electronic devices such as portable computers and cellular telephones are often provided with wireless communications capabilities. For example, electronic devices may use long-range wireless communications circuitry such as cellular telephone circuitry and WiMax (IEEE 802.16) circuitry. Electronic devices may also use short-range wireless communications circuitry such as WiFi® (IEEE 802.11) circuitry and Bluetooth® circuitry.

Antenna performance affects the ability of a user to take advantage of the wireless capabilities of an electronic device. If antenna performance is not satisfactory, calls may be dropped or data transfer rates may become undesirably slow. To ensure that antenna performance meets design criteria, it may sometimes be desirable to provide an electronic device with multiple antennas. In some situations, control circuitry within a device may be able to switch between antennas to ensure that an optimum antenna is being used to handle call traffic.

The ability to switch to an optimum antenna rapidly can help ensure that wireless communications are not disrupted. At the same time, accuracy should not be sacrificed. In real-world environments a variety of factors may affect antenna performance, such as path loss fluctuations and antenna blocking events involving the momentary presence of external objects over part of an antenna. If care is not taken, antenna switching response may be rapid but inaccurate or accurate but slow.

It would therefore be desirable to be able to provide improved ways for electronic devices such as devices with multiple antennas to determine how to switch between antennas during operation.

SUMMARY

Electronic devices may be provided that contain wireless communications circuitry. The wireless communications circuitry may include radio-frequency transceiver circuitry coupled to multiple antennas.

Signal strength measurements may be gathered using the antennas and a corresponding signal strength difference measurement may be produced. The difference measurement may reflect whether one of the antennas is exhibiting superior performance to the other. If it is determined that an alternate antenna is performing better than a currently used antenna, the alternate antenna may be switched into use.

Signal strength difference measurements may be processed using a control algorithm in the electronic device to determine whether or not to switch antennas. The signal strength difference measurements may be filtered using time-based averaging filters with different speeds. Corresponding filtered difference measurements may be compared to antenna switching criteria such as antenna switching thresholds.

The electronic device may be operated in environments in with the difference measurements fluctuate slowly (sometimes referred to as slow fading environments) and may be operated in environments in which the difference measurements fluctuate more rapidly (sometimes referred to as fast fading environments).

The averaging filters may include a slow filter and a fast filter. The slow filter may average the difference measurements over a relatively long time period to produce accurate results in both slow fading and fast fading environments The fast filter may average the difference measurements over a shorter time period to allow the control algorithm to respond more rapidly to difference measurement fluctuations than is possible using the slow filter alone.

The output of the slow filter and the output of the fast filter may be compared to respective slow filter and fast filter threshold values to determine whether or not to request that an alternative antenna be switched into use in place of the currently active antenna.

The fast filter threshold may be adjusted in real time based on computations of how much variation is exhibited as a function of time between the filtered difference measurements In fast fading environments in which the output of the last filter is close to that of the slow filter, the fast filter threshold can be reduced to allow increased antenna switching speed using the fast filter branch of the control algorithm. In slow fading environments in which the output of the fast filter and the slow filter differ, the fast filter threshold can be increased to ensure that the fast-filter branch of the control algorithm does not produce inaccurate antenna switching requests. To ensure that the device responds appropriately when transitioning from fast fading to slow fading environments, information on device movement or other data may be used in making threshold adjustments.

Further features of the inventions its nature and various advantages will be more apparent from the accompanying drawings and the following detailed description of the preferred embodiments.

DETAILED DESCRIPTION

Electronic devices may be provided with wireless communications circuitry. The wireless communications circuitry may be used to support wireless communications in multiple wireless communications bands. The wireless communications circuitry may include multiple antennas arranged to implement an antenna diversity system.

The antennas can include loop antennas, inverted-F antennas, strip antennas, planar inverted-F antennas, slot antennas, hybrid antennas that include antenna structures of more than one type, or other suitable antennas. Conductive structures for the antennas may be formed from conductive electronic device structures such as conductive housing structures (e.g., a ground plane and part of a peripheral conductive housing member or other housing structures), traces on substrates such as traces on plastic, glass, or ceramic substrates, traces on flexible printed circuit boards ("flex circuits"), traces on rigid printed circuit boards (e.g., fiberglass-filled epoxy boards), sections of patterned metal foil, wires, strips of conductor, other conductive structures, or conductive structures that are formed from a combination of these structures.

Figure 1:
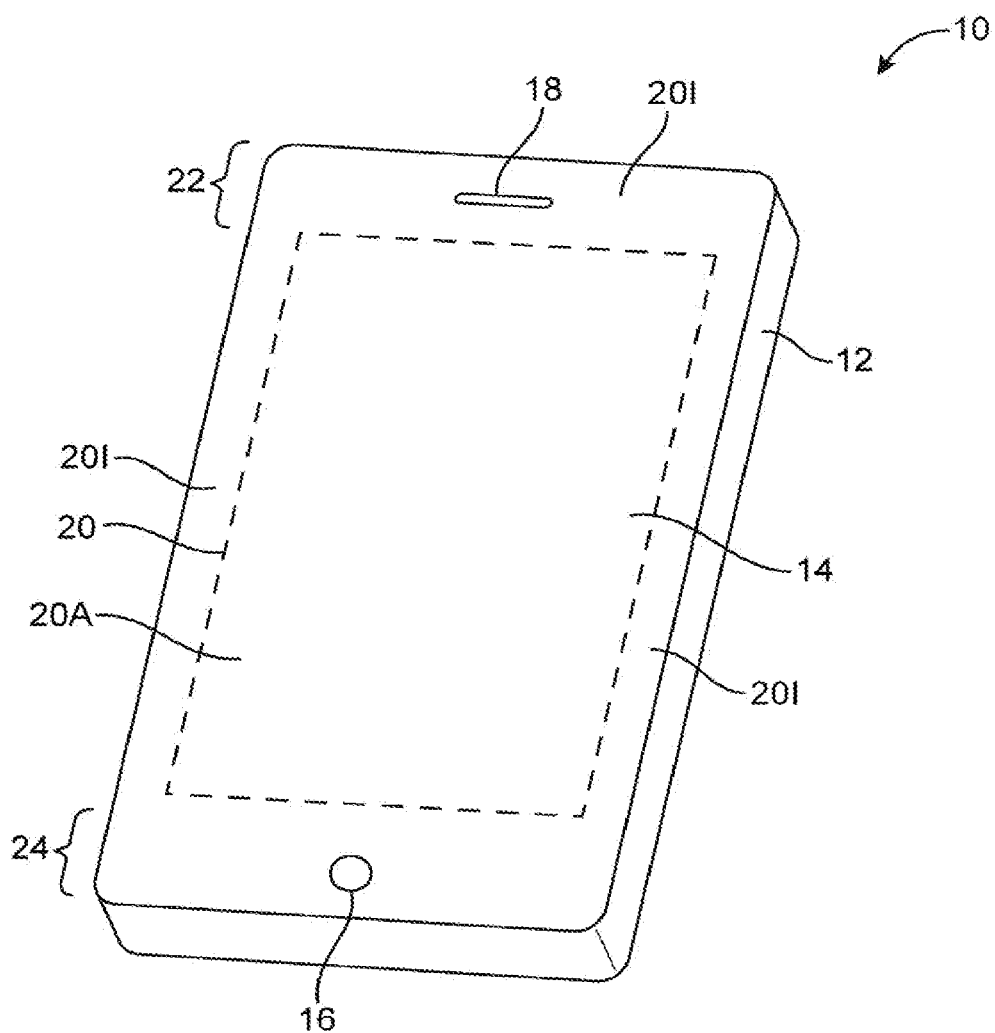
FIG. 1 is a perspective view of an illustrative electronic device with wireless communications circuitry having multiple antennas in accordance with an embodiment of the present invention.

An illustrative electronic device of the type that may be provided with one or more antennas (e.g., two antennas, three antennas, four antennas, five or more antennas, etc.) is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covets display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the tear or front of device 10, as extending elements or attachable structures, or elsewhere in device 10. With one suitable arrangement, which is sometimes described herein as an example, device 10 may be provided with one or more antennas at lower end 24 of housing 12 and one of more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

It desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or art inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover a either a first subset of bands or a second subset of bands and thereby cover all bands of interest.

Figure 2:
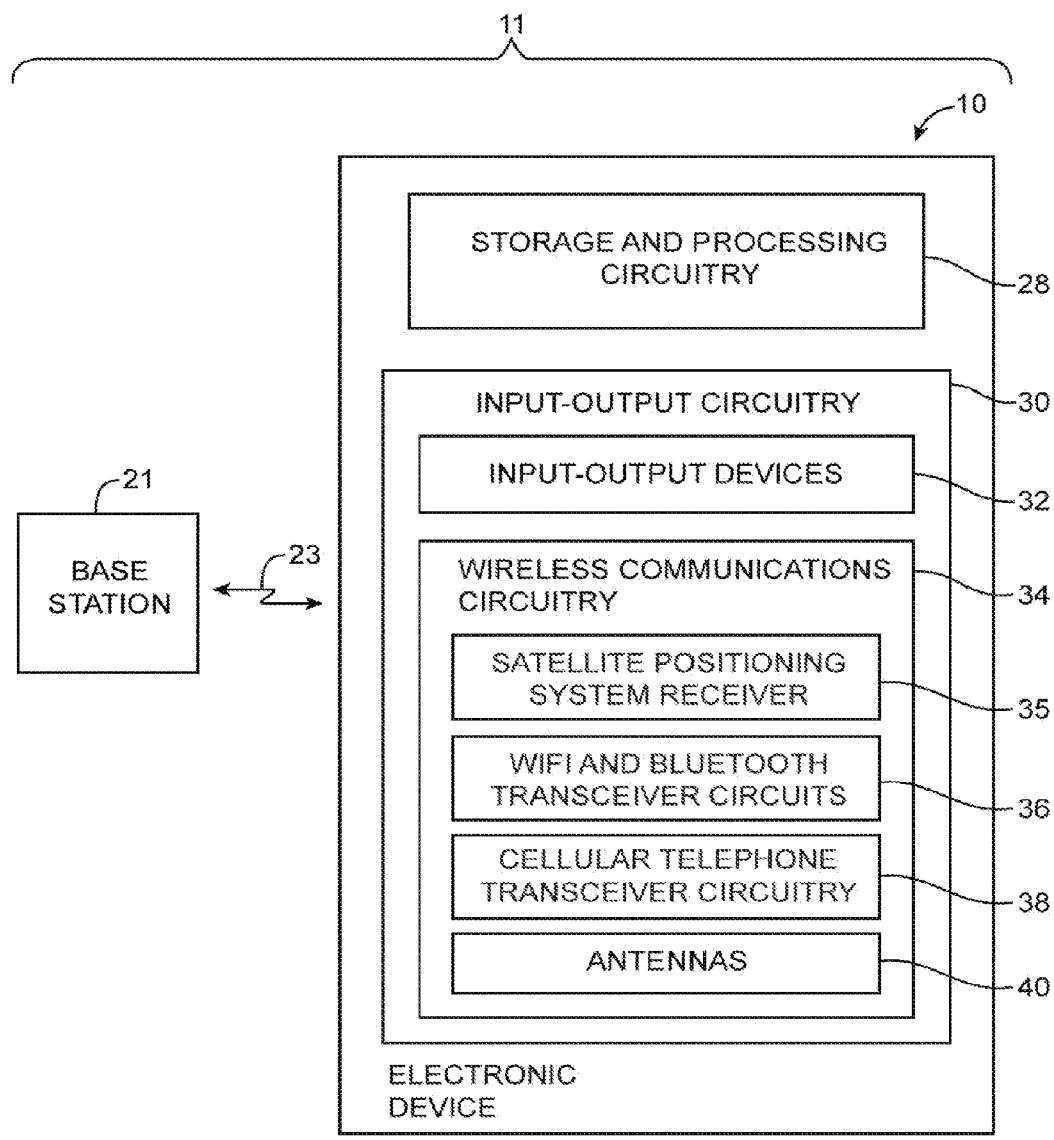
FIG. 2 is a schematic diagram of a wireless network including a base station and an illustrative electronic device with wireless communications circuitry having multiple antennas in accordance with an embodiment of the present invention.

A schematic diagram of a system in which electronic device 10 may operate is shown in FIG. 2. As shown in FIG. 2 system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communications link).

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive) volatile memory (e.g., static or dynamic random-access-memory), etc. Processing circuitry in storage and processing circuitry 28 and other control circuits such as control circuits in wireless communications circuitry 34 may be used to control the operation of device 10. This processing circuitry may be based on one or more microprocessors, microcontrollers, digital signal processors, baseband processors power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms that control the use of antennas in device 10. For example, circuitry 28 may configure wireless circuitry 34 to switch a particular antenna into use for transmitting and/or receiving signals. In some scenarios, circuitry 28 may be used in gathering sensor signals and signals that reflect the quality of received signals (e.g., received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information may be used in controlling which antenna is used. Antenna selections can also be made based on other criteria.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, accelerometers (motion sensors), ambient light sensors, and other sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RE) transceiver circuitry formed from one or more integrated circuits, power amplifier circuitry, low-noise input amplifiers, passive RF components, one or more antennas, and other circuitry for handling RF wireless signals.

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired (e.g., WiMax circuitry, etc.) Wireless communications circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable types of antenna. For example antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna. As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
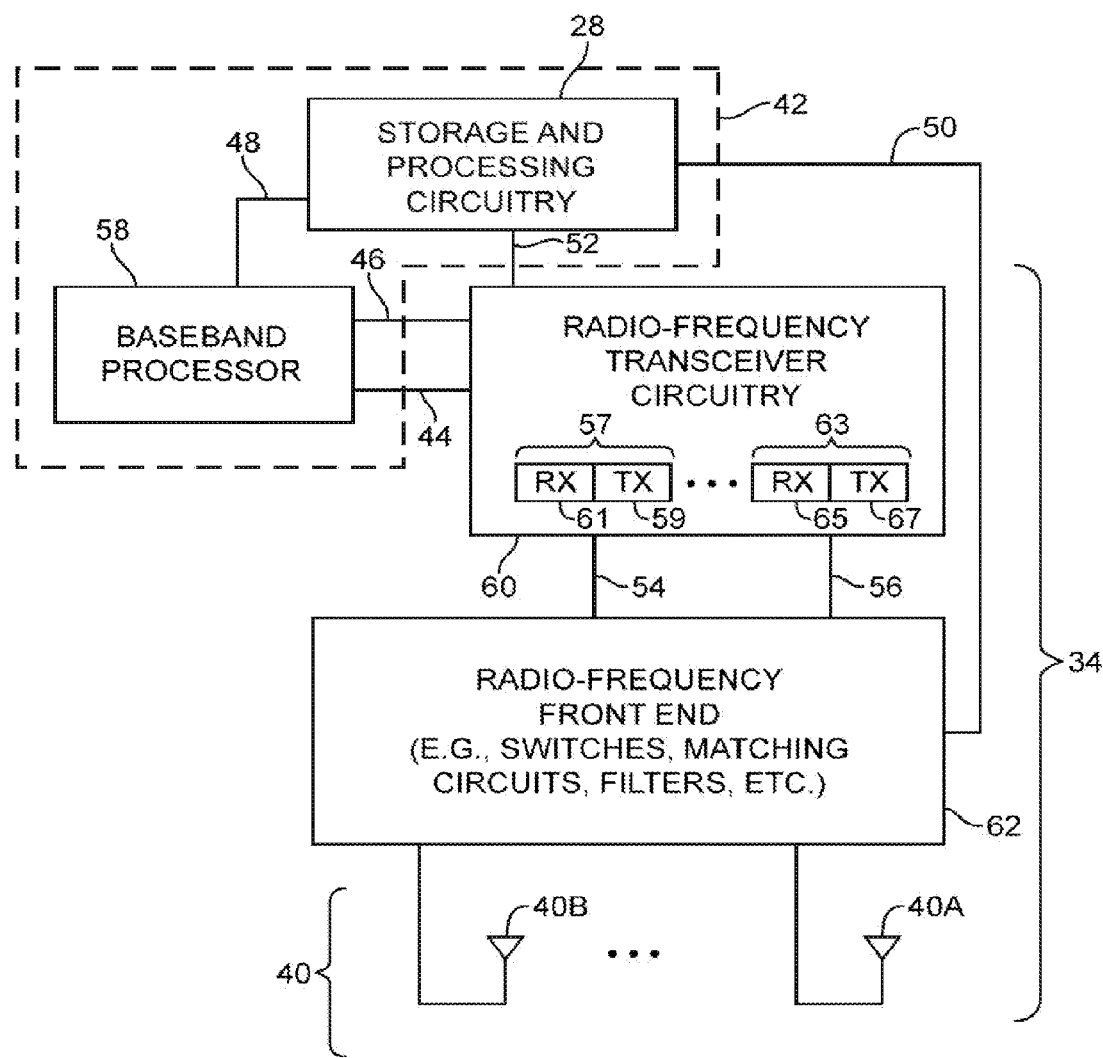
FIG. 3 is a diagram of illustrative wireless circuitry including multiple antennas and circuitry for controlling use of the antennas in accordance with an embodiment of the present invention.

Device 10 can be controlled by control circuitry that is configured to store and execute control code for implementing control algorithms (e.g., antenna diversity control algorithms and other wireless control algorithms). As shown in FIG. 3, control circuitry 42 may include storage and processing circuitry 28 (e.g., a microprocessor, memory circuits, etc.) end may include baseband processor 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, and other information that is reflective of the performance of wireless circuitry 34. This information may be analyzed by storage and processing to circuitry 28 and/or processor 58 and, in response, storage arid processing circuitry 28 (or, if desired, baseband processor 58) may issue control commands for controlling wireless circuitry 34. For example, storage and processing circuitry 28 may issue control commands on path 52 and path 50.

Wireless circuitry 34 may include radio-frequency transceiver circuitry such as radio-frequency transceiver circuitry 60 and radio-frequency front-end circuitry 62. Radio-frequency transceiver circuitry 60 may include one or 20 more radio-frequency transceivers such as transceivers 57 and 63 (e.g., one or mare transceivers that are shared among antennas, one transceiver per antenna, etc.) In the illustrative configuration of FIG. 3, radio-frequency transceiver circuitry 60 has a first transceiver such as transceiver 57 that is associated with path (port) 54 (and which may be associated with path 44) and a second transceiver such as transceiver 63 that is associated with path (port) 56 (and which may be associated with path 46). Transceiver 57 may include a transmitter such as transmitter 59 and a receiver such as receiver 61 or may contain only a receiver (e.g., receiver 61) or only a transmitter (e.g., transmitter 59). Transceiver 63 may include a transmitter such as transmitter 67 and a receiver such as receiver 65 or may contain only a receiver (e.g., receiver 65) or only a transmitter (e.g., transmitter 67).

Baseband processor 58 may receive digital data that is to be transmitted from storage and processing circuitry 26 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by transmitters 59 and 67 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60 such as receiver 61 at port 54 and receiver 63 at port 56, and paths such as paths 44 and 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, signal-to-interference ratio (SINR) information, signal-to-noise ratio (SNR) information, channel quality measurements based on signal quality data such as Ec/Io or Ec/No data, etc. This information may be used in controlling which antenna(s) to use in device 10. For example, a control algorithm running on control circuitry 42 may be used to switch a particular antenna into use based on signal strength data measurements such as these.

Radio-frequency front end 62 may include a switch that is used to connect transceiver 57 to antenna 40B and transceiver 63 to antenna 40A or vice versa. The switch may be configured by control signals received from control circuitry 42 over path 50. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver between two antennas).

If desired, antenna selection may be made by selectively activating and deactivating transceivers without using a switch in front end 62. For example, if it is desired to use antenna 40B, transceiver 57 (which may be coupled to antenna 40B through circuitry 62) may be activated and transceiver 63 (which may be coupled to antenna 40A through circuitry 62) may be deactivated. If it is desired to use antenna 40A circuitry 42 may activate transceiver 63 and deactivate transceiver 57. Combinations of these approaches may also be used to select which antennas are being used to transmit and/or receive signals.

Control operations such as operations associated with configuring wireless circuitry 34 to transmit or receive radio-frequency signals through a desired one of antennas 40 may be performed using a control algorithm that is implemented on control circuitry 42 (e.g., using the control circuitry and memory resources of storage and processing circuitry 28 and baseband processor 58).

Antenna operation can be disrupted when an antenna in device 10 is blocked by an external object such as a user's hand, when device 10 is placed near objects that interfere with proper antenna operation, or due to other factors (e.g., device orientation relative to its surroundings, etc.). To ensure that an optimum antenna is used, device 10 may monitor the signals received on each antenna and can switch an appropriate antenna into use for handling the wireless communications traffic for device 10 based on the monitored signals.

An antenna switching algorithm that runs on the circuitry of device 10 can be used to automatically perform antenna switching operations based on the evaluated signal quality of received signals. The antenna switching algorithm may direct device 10 to select a new antenna for use in handling wireless signals (e.g., cellular telephone signals or other wireless traffic) whenever antenna performance on the currently used antenna has degraded relative to an available alternate antenna or when other antenna switching criteria have been satisfied. With this type of arrangement, it is not necessary to simultaneously use multiple antennas and associated circuits for handling wireless signals, thereby minimizing power consumption.

Arrangements in which device 10 has a first antenna and a second antenna are sometimes described herein as an example. This is, however, merely illustrative. Device 10 may use three or more antennas if desired. Device 10 may use antennas that are substantially identical (e.g., in band coverage, in efficiency, etc.), or may use other types of antenna configurations.

In performing antenna switching operations, device 10 may measure signal strength using any suitable signal quality metric. As an example, device 10 may measure received signal power, may gather received signal strength indicator (RSSI) information, may gather received signal code power (RSCP) information, or may gather other information on received signal strength.

Received signal strength information may be gathered for each antenna in device 10. For example, if device 10 includes upper and lower antennas, the signal strength for signals received in both the upper and lower antennas can be gathered. The received signal strengths of the upper and lower antennas may be processed by an antenna switching control algorithm. The switching algorithm may use switching criteria and the measured received antenna signal strengths to determine in real time whether the antenna assignments in device 10 should be switched. If the switching criteria are satisfied, the antennas can be swapped. If, for example, it is determined by comparing received signal strength data to threshold settings that the lower antenna is being blocked, the upper antenna may be switched into use in place of the lower antenna.

To ensure that device 10 remains responsive during a variety of environmental conditions, switching criteria (i.e., one or more switching thresholds or other switching algorithm parameters) may be adjusted in real time. Arrangements in which device 10 adjusts the value of one or more thresholds based on measured values of received signal strength may sometimes be referred to as adaptive threshold arrangements.

To suppress noise while ensuring rapid response to changing conditions, time-based averaging filters may be applied to received signal strength measurements. Multiple filters may be used, each with different associated filtering characteristics. For example, there may be two, three, or more than three filters each of which has different associated filtering characteristics. With one suitable arrangement, which may sometimes be described herein as an example, device 10 may use a pair of time-based filters.

The time-based filters may average signals over relatively longer time periods (sometimes referred to as slow filtering) and relatively shorter time periods (sometimes referred to as fast filtering). Slow filters produce accurate data, but do not respond quickly to abrupt change in true signal strength. Fast filters respond quickly. However, because fast filters average signals over shorter time windows than slow filters, fast-filtered signal strength measurements tend to be noisier than slow-filter signal strengths. It may therefore be necessary to compare fast-filtered signal measurements to larger threshold values than slow-filtered signal measurements to avoid false alarms (i.e., to avoid situations in which antennas are switched at inappropriate times).

If desired, input from an external source may be used in making an antenna switching decision. Input from an external source may include, for example, information from one or more sensors in device 10. As an example, data from an accelerometer in input-output devices 32 may be used to produce information on the motion of device 10. Accelerometer data may be used to determine whether device 10 is in a rapidly moving environment (e.g., within a car or other moving vehicle) or has suddenly stopped moving. Satellite navigation system receiver data such as Global Positioning System (GPS) data can also be used to determine the velocity of device 10 (i.e., whether device 10 is moving or is stationary). Information on device movement and other external data may be used to adjust threshold values and other antenna switching criteria in real time. For example, motion information from a GPS receiver or accelerometer or other data may be used to ensure that device 10 adjusts an antenna switching threshold quickly when device 10 comes to rest after being in motion.

Figure 4:
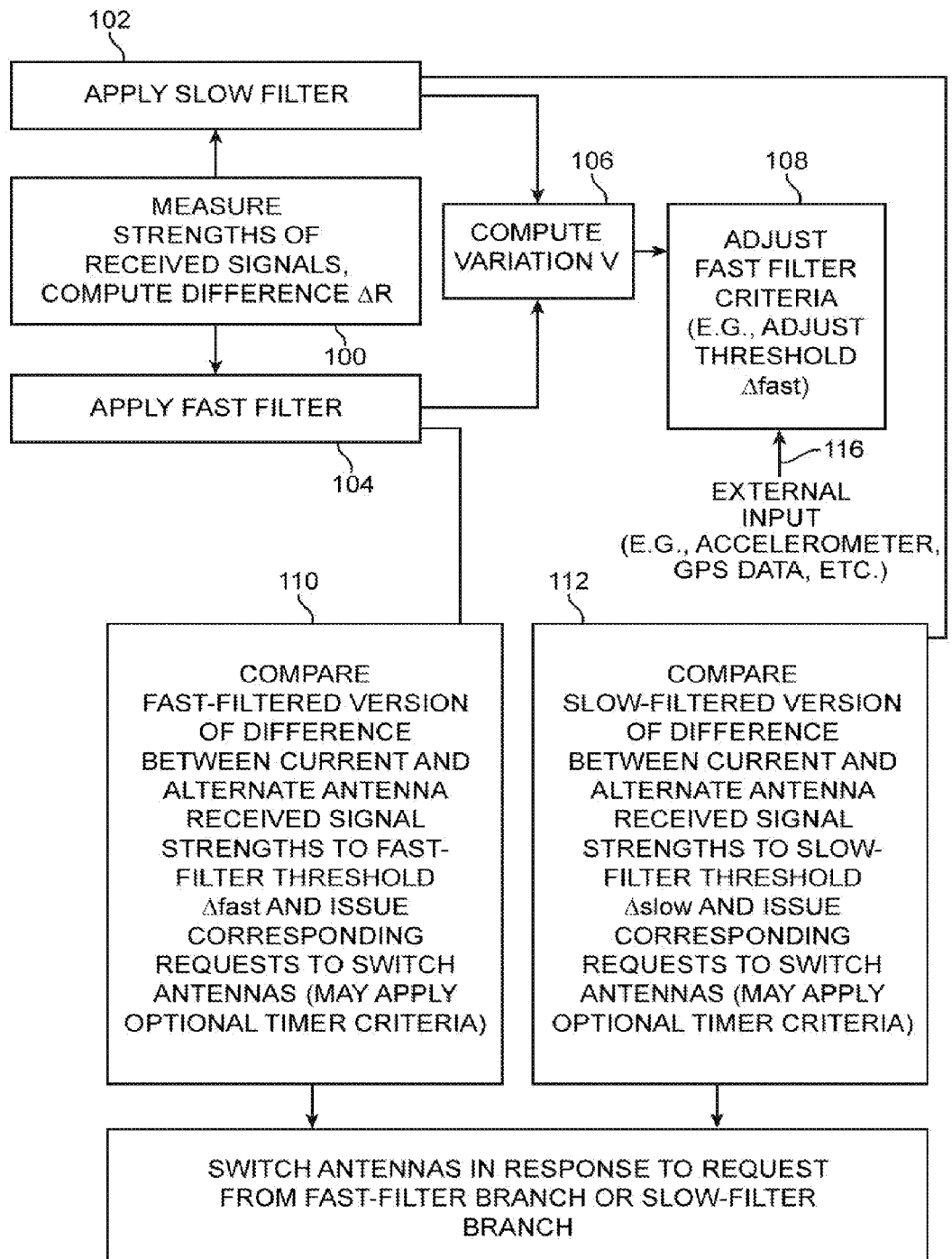
FIG. 4 is a flow chart of illustrative operations involved in controlling the operation of an electronic device with multiple antennas to ensure an optimum antenna is used in accordance with an embodiment of the present invention.

A flow chart of illustrative steps involved in controlling antenna assignments in device 10 is shown in FIG. 4. The example of FIG. 4 involves a configuration for device 10 that has two antennas (e.g., upper and lower antennas in regions 22 and 24).

During the operations of step 100, signal strength measurements may be made for each of the two antennas. In particular, a signal strength RC may be measured for a first of the antennas (i.e., the current antenna being used to handle wireless traffic for device 10) and a signal strength RA may be measured for a second of the antennas (i.e. an alternate antenna that is available to take the place of the current antenna). The difference between these signals strengths (i.e., signal strength $\Delta R = RA - RC$) may then be computed.

When receiver diversity functions are available in wireless circuitry 34 (i.e., in configurations for device 10 in which the circuitry baseband processor 58 supports receive diversity operations), receivers 65 and 61 and corresponding first and second antennas can be used in receiving signals. In situations in which receiver diversity functions are unavailable, only one of the antennas in device 10 (i.e., the current antenna) is generally used at a time to transmit and receive wireless communications traffic. To determine the signal strength for received signals on the other antenna (i.e. the alternate antenna), device 10 may sample the received signal strength on the alternate antenna by momentarily using a receiver that is associated with the alternate antenna to gather and process incoming signals or by momentarily switching the alternate antenna into use to gather a signal strength sample without disrupting the ability of the currently active antenna to handle its wireless traffic.

The operations of FIG. 4 such as signal measurement and signal processing activities may be performed using wireless circuitry 34 (e.g., transceiver circuitry 60) and control circuitry 42 (e.g., baseband processor 58 and/or circuitry 28). When the computed signal strength difference between the antennas indicates that the alternate antenna is receiving weaker signals than the current antenna or is receiving signals that are only slightly stronger than the current antenna, device 10 may maintain the current antenna assignments in device 10. When the computed signal strength difference between the antennas indicates that the alternate antenna is switched into use in place of the current antenna.

The difference between the signal strengths of the received signals for the antennas (i.e., difference measurement Δ, which reflects how much received antenna signal strength differs between the two antennas) may be time averages (time filtered) using time-based filters with different associated time windows (averaging periods). Any suitable filtering scheme may be used (e.g., a linear average, a weighted averaged that favors more recent activity, finite impulse response (FIR) or infinite impulse response (IIR) filters, etc.). As shown in FIG. 4, two different filters may be applied to the measured ΔR data. A slow filter (i.e., a filter that averages measured ΔR values over a relatively longer time period such as a time period of 0.5 to 2 seconds or other suitable time period) may be applied at step 102. Application of the slow filter to the raw measured values of ΔR produced a slow-filtered version of ΔR at the output of the slow filter. A fast filter (i.e., a filter that averages measured ΔR values over a relatively shorter time period such as a time period of 50-150 ms or other suitable time period) may be applied at step 104. Application of the fast filter to the measured difference values ΔR produces a fast-filtered version of ΔR at the output of the fast filter.

Antenna switching criteria may be applied to the slow-filtered version of the measured ΔR data during the operations of step 112. For example, the slow-filter version of the measured ΔR data may be compared to a threshold (sometimes referred to as a slow threshold or slow-filter threshold) at step 112. Antenna switching criteria may also be applied to the fast-filtered version of the measured ΔR data during the operations of step 110. For example, the fast-filter version of the measured ΔR data may be compared to a threshold (sometimes referred to as a fast threshold or fast-filter threshold) at step 110.

The outcome of the comparison operations of steps 110 and 112 may be used to generate corresponding requests to switch the antennas. For example, if the fast-filtered version of ΔR is greater than a fast-filter threshold Δfast, a request to switch antennas may be generated at step 110. If the slow-filtered version of ΔR is greater than the slow-filter threshold Δslow, a request to switch antennas may be generated at step 112. The requests that are generated may be represented by Boolean values (e.g., a logical "1" may represent a request to swap antennas and a logical "0" may represent a desire to maintain the current set of antenna assignments).

During the operations of step 114, device 10 can use control circuitry 42 to issue corresponding commands to wireless circuitry 34. With one suitable arrangement, the requests produced at steps 110 and 112 may be processed using a logical "OR" function. If no request to swap antennas was generated at step 110 and if no request to swap antennas was generated at step 112, device 10 may decline to swap antennas at step 114. If either the fast-threshold comparison operations of step 110 or the slow-threshold comparison operations of step 112 indicate that the antennas are to be swapped (or if the operations of both step 110 and step 112 indicate that the antennas should be swapped), device 10 may, at step 114, switch antennas so that the current antenna is replaced with the alternate antenna. Following switching, the newly selected antenna may be used to receive and/or transmit radio-frequency signals for device 10. In situations in which receiver diversity is available in device 10, device 30 may use both antennas to receive signals while using the newly selected antenna for transmission. Device 10 way continuously use the steps of FIG. 4 to ensure that an optimum antenna is switched into use at all times.

In situations in which the magnitude of difference signal ΔR varies slowly, the fast-filtered output of step 102 may closely track ΔR. To avoid premature antenna switching when the fast-filtered output rises quickly due to a rapid upwards fluctuation in ΔR, it may be desirable to set Δfast to a higher value than Δslow. For example, the default (unadjusted) value for Δfast may be 10 dB (as an example) and the (typically fixed) value of Δslow may be 3 dB (as an example). In general, Δfast and Δslow may have values of about 0.5 to 13 dB (as examples).

In environments in which the values of the slow-filtered and fast-filtered versions of ΔR are close to one another the use of the fast-filter branch of the process shown it FIG. 4 will generally yield antenna switching requests that are comparable to antenna switching requests produced using the slow-filtered branch of the process shown in FIG. 4. In this type of situation, it may be desirable to adaptively lower the value of Δfast. For example, it may be desirable to lower Δfast to a level equal to or comparable to Δslow. Lowering Δfast in this way allows device 10 to respond more quickly to moderately sized variations in ΔR than would otherwise be possible.

To allow the fast threshold Δfest or other antenna switching criteria to be adjusted, it may be desirable to determine the variation (V) between the slow-filtered and fast-filtered versions of ΔR. As shown in FIG. 4, the variation between the slow-filtered and fast-filtered versions of ΔR may be computed at step 106. Any suitable metric may be used to gauge the amount of variation between the slow-filtered and fast-filtered versions of ΔR (e.g., standard deviation, variance, a variation value that is based on a standard deviation calculation in which the average of the slow-filtered data serves as the mean, a sum of squares, etc.)

When variation V is small, the fast-filtered data is close in magnitude to the slow-filtered data (i.e., the fast-filtered data is accurate and will not result in false alarms and premature switching). It is therefore acceptable to make switching decisions at step 110 based on the fast-filtered data. This may be accomplished by lowering the value of Δfast as a function of reduced values of V. When variation V is large, potentially inaccurate switching decisions based on fast-filtered data may be suppressed by raising Δfast.

The variation V between the slow-filtered and fast-filtered data tends to be low whenever the value of ΔR varies quickly (sometimes referred to as fast fading). Device 30 may be subjected to relatively rapid variations in ΔR when moving quickly (e.g., when device 10 is located in a moving vehicle).

The variation V between the slow-filtered and fact-filtered data tends to be high whenever the value of ΔR varies slowly (sometimes referred to as a slow fading environment) Device 10 may be subject to slow fading when device 10 is moving slowly or is stationary.

After sustained operation in a fast fading environment such as the interior of a moving automobile, the value of variation V will generally be low and Δfast will have been reduced to a correspondingly low value. If the automobile stops suddenly, device 10 may rapidly transition from a fast fading to a slow fading environment. To minimize false alarms and undesired antenna switching, it may be desirable to automatically increase the value of Δfast whenever sensors, satellite navigation system signals (GPS data) or other data reveals that device 10 has transitioned from a fast fading to a slow fading environment (e.g., when GPS or sensor data detects that device 10 has transitioned from a moving to a stationary environment). The use of GPS data, sensor data, and other data to serve as input to threshold adjustment step 108 is illustrated by line 116 of FIG. 4.

Adjustments to threshold Δfast or other antenna switching criteria adjustments during step 108 may be made in a stepwise fashion (e.g., by returning Δfast immediately to a default higher Δfast value), may be made relatively slowly (e.g., without influence from input 116), or may be made at a moderate speed (e.g., more slowly than an immediate change but, by using input 116, more quickly than would otherwise be possible).

When making comparisons between antennas in steps 110 and 112, it may be desirable to take into account different antenna receiving efficiencies and maximum transmit power limits. For example, if the transmit efficiency Lot a first antenna is 1 dB larger than the receive efficiency on a second antenna, a 1 dB compensating offset may be added to the threshold comparisons to ensure that the favorable transmit performance of the first antenna is taken into account. As another example, if the maximum transmit power for the second antenna is 3 dB lower than the maximum transmit power for the first antenna (e.g., due to a need to comply with specific absorption rate limits), this 3 dB performance limit may be taken into account when determining whether it would be favorable to witch to use of the second antenna.

Figure 5:
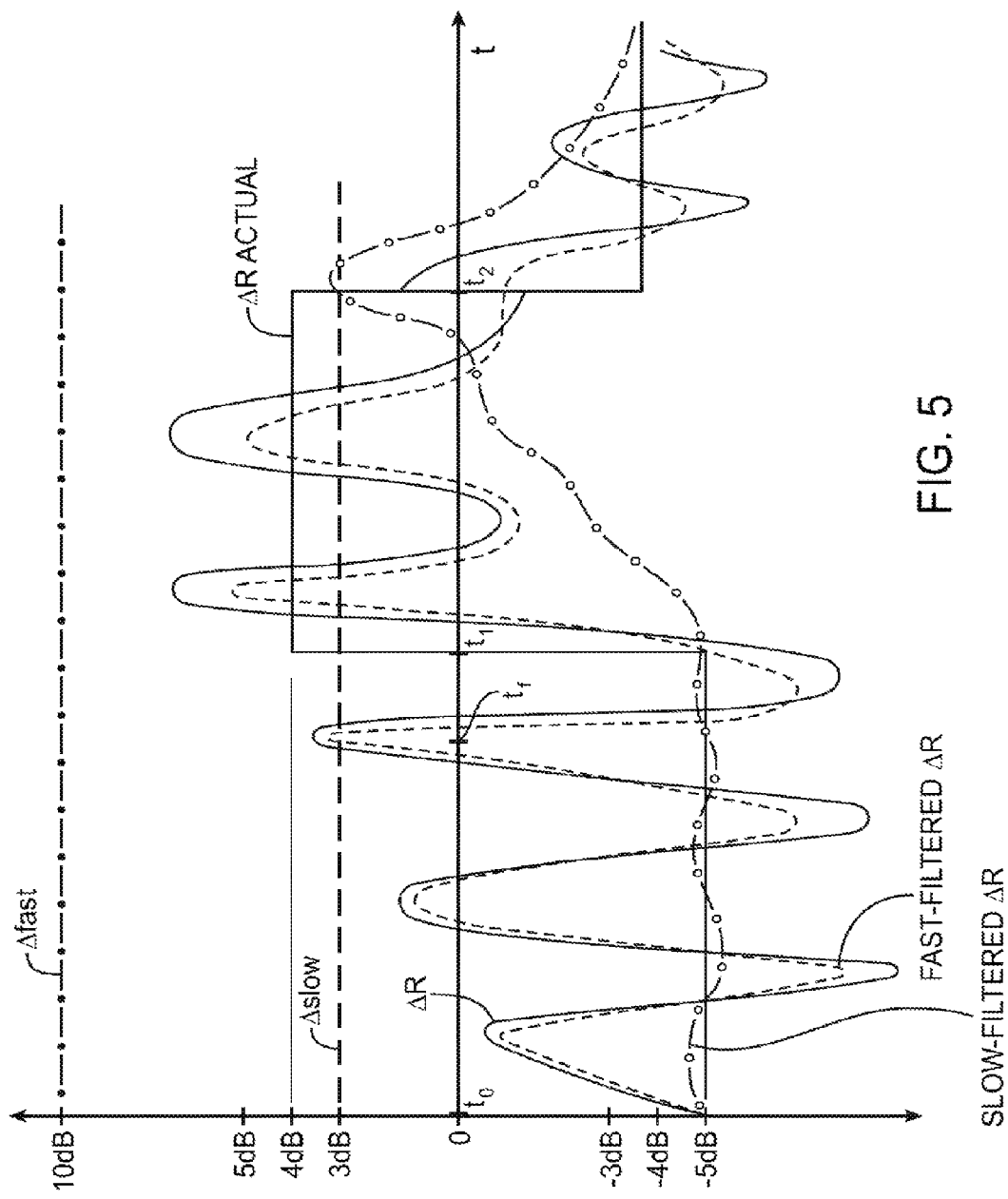
FIG. 5 is a graph showing how antenna switching criteria may be applied to measured antenna signal strengths to determine when to switch antennas in an environment with a relatively small difference in received signal strength between antennas and relatively slow signal strength fluctuations in accordance with an embodiment of the present invention.

The graph of FIG. 5 illustrates how the operations of FIG. 4 may be used to switch antennas in device 10 when device 10 is in a slow fading environment (e.g., an environment where ΔR changes with a time constant of about 0.4 to 0.5 seconds) and when the magnitude of the change in ΔR actual (the actual value of the relative performance of the antennas in device 10) during an antenna blocking event is relatively small (e.g., less than 10 dB). During times between t0 and t1, the current antenna is not blocked and is performing 5 dB better than the alternate antenna. At time t1, the current antenna is blocked by an external object. As result, at time t1, the alternate antenna is performing 4 dB better than the current antenna.

To determine whether or not to switch from the current antenna to the alternate antenna, device 10 applies a slow filter to signal ΔR to produce slow-filtered ΔR and applies a fast filter to signal ΔR to produce fast-filtered ΔR. Because device 10 in the FIG. 5 scenario is in a slow fading environment, fast-filtered ΔR closely tracks signal ΔR, whereas between times t0 and t1, slow-filtered ΔR is close to the actual value of ΔR actual.

Because device 10 is being operated in a slow fading environment, the variance V between slow-filtered ΔR and fast-filtered ΔR is large. During the operations of step 108, device 10 therefore maintains threshold Δfast at its nominal (default) value of 10 dB. Because Δfast remains at 10 dB, device 10 does not exhibit a false alarm at time tf (i.e., the antennas axe not switched at time tf, because fast-filtered ΔR is less than Δfast at time tf).

The abrupt transition in ΔR (actual) at time t1 causes signal ΔR to increase. Fast-filtered ΔR follows ΔR, but, because Δfast is set to the relatively high value of 10 dB, the comparison operations of step 110 do not result in a request from the fast branch of the control algorithm to swap antennas.

After time t1, the value of slow-filtered ΔR rises until this value exceeds Δslow (3 dB in this example) at tine t2. When slow-filtered ΔR exceeds Δslow, the comparison operations of step 112 generate a request to swap antennas. Device 10 therefore swaps antennas at time t2 (step 114 of FIG. 4). Then the alternate antenna is switched into use in place of the current antenna at time t2, the ability of device 10 to properly receive and transmit signals is restored. At times t greater than time t2, the current antenna is performing 4 dB better than the alternate antenna and no switching is taking place.

Figure 6:
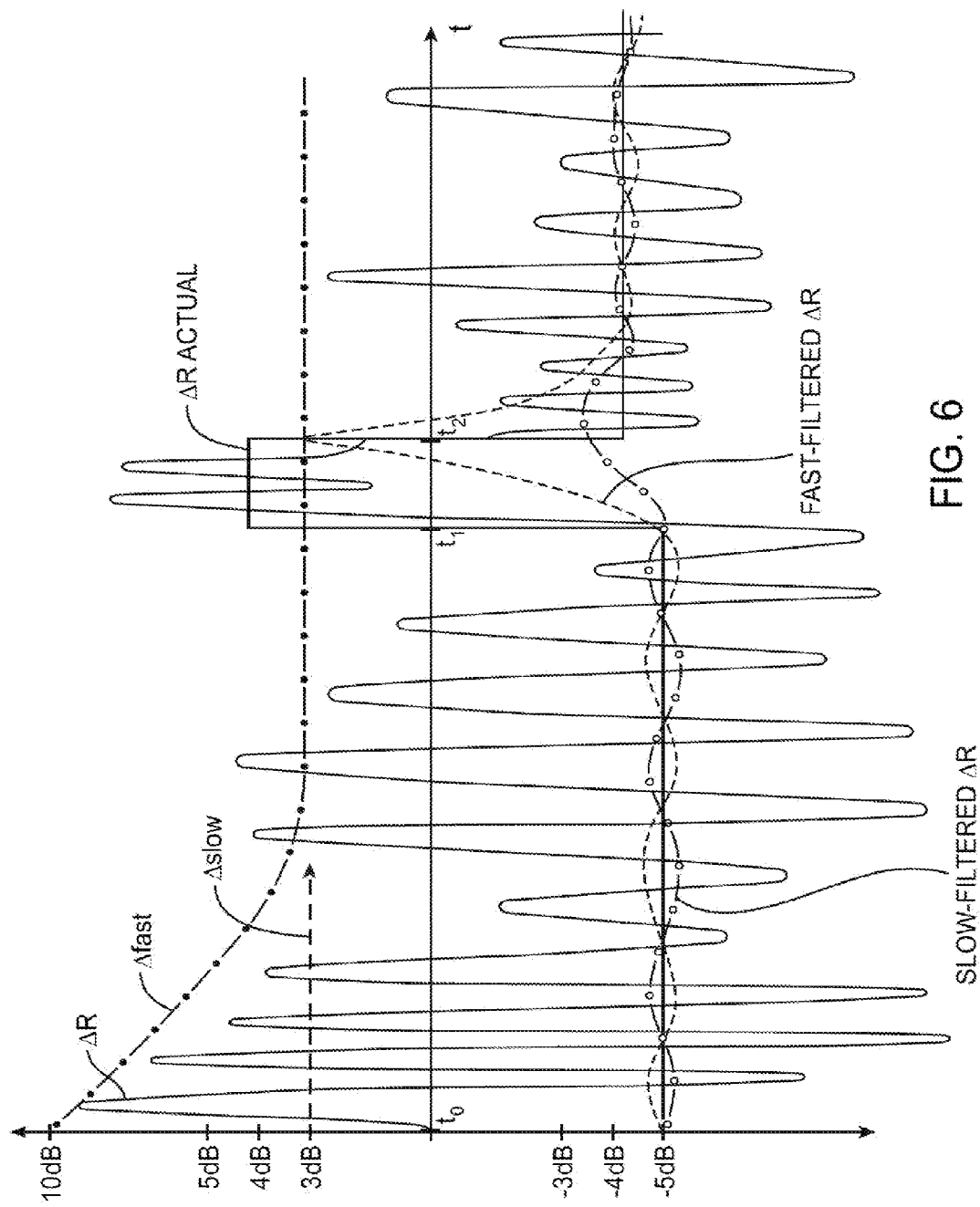
FIG. 6 is a graph showing how antenna switching criteria may be applied to measured antenna signal strengths to determine when to switch antennas in an environment with a relatively small difference in signal strength between antennas and relatively rapid signal strength fluctuations in accordance with an embodiment of the present invention.

The graph of FIG. 6 illustrates how device 10 may respond to an antenna blocking event in a fast fading environment (e.g., an environment where ΔR changes with a time constant of about 2-10 milliseconds) where the change in magnitude of ΔR actual during the antenna blocking event is relatively small (e.g., less than 10 dB). Because device 10 is being operated in a fast fading environment in the FIG. 6 example, fast-filtered a does not track ΔR, but rather represents an accurate average of ΔR that is close in magnitude to ΔR actual. In this situation, the variation V between slow-filtered ΔR and fast-filtered ΔR is small. When V is small, device 10 adaptively adjusts Δfast, as shown by the decreasing value of Δfast as a function of time in the graph of FIG. 6. The decreased value of Δfast helps device 10 switch antennas quickly based on decisions from the fast-filter branch of the control algorithm.

At time t1, the current antenna is blocked, causing ΔR actual to increase to 4 dB (indicating that the alternate antenna is performing 4 dB better than the current antenna). Slow-filtered ΔR does not respond quickly to the change in ΔR following time t1. However, fast-filtered ΔR responds quickly. At time t2 fast-filtered ΔR exceeds threshold Δfast and, in response, the alternate antenna is switched into use in place of the current antenna.

Figure 7:
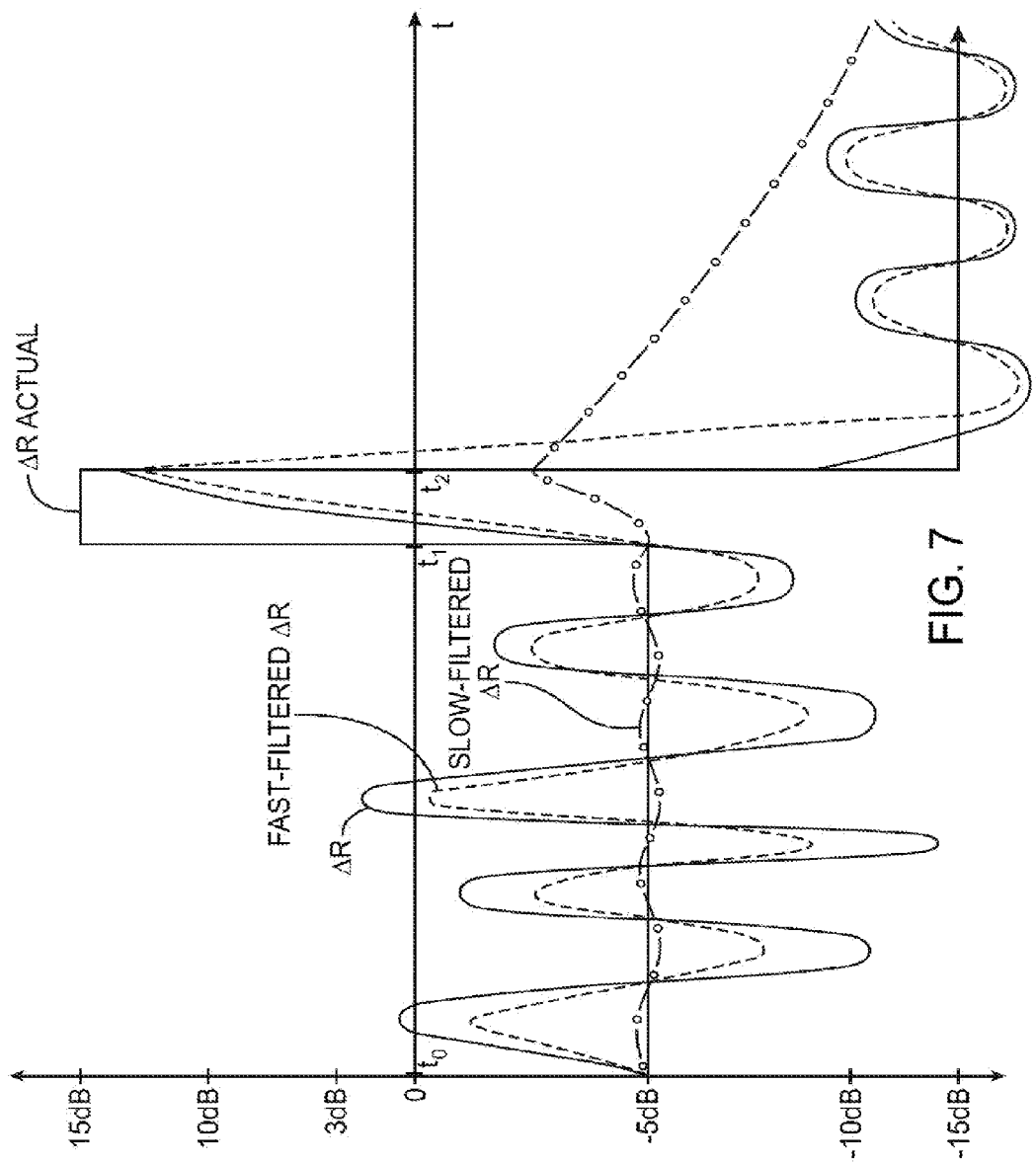
FIG. 7 is a graph showing how antenna switching criteria may be applied to measured antenna signal strengths to determine when to switch antennas in an environment with a relatively large difference in signal strength between antennas in accordance with an embodiment of the present invention.

FIG. 7 illustrates the performance of device 10 in a scenario in which an antenna blocking event causes a relatively large change (more than 10 dB) in ΔR actual. In the FIG. 7 example, device 10 is being operated in a slow fading environment. Due to the slow fading environment, slow-filtered ΔR and fast-filtered ΔR differ substantially at times t before t1. As a result, variation V is relatively high and Δfast remains at its nominal value of 10 dB. At time t1, the current antenna is blocked. Slow-filtered ΔAR responds slowly and does not exceed Δslow. However, fast-filtered ΔR responds quickly. At time t2, fast-filtered ΔR exceeds Δfast (e.g., 10 dB) and device 10 swaps the alternate antenna into use in place of the current antenna. The FIG. 7 example shows how the fast-filter branch of the control algorithm can issue accurate antenna switching requests even in a slow fading environment, provided that the change in ΔR actual during an antenna blocking event is larger than the default value of Δfast.

As illustrated in the FIG. 6 and 7 examples, the presence of a fast filter branch in the antenna switching control algorithm allows device 10 to switch optimum antenna into use more rapidly than would be possible in a device that only contained a slow branch. When conditions allow (e.g., in the fast fading environment of FIG. 6), the value of the fast threshold Δfast may be reduced to increase the rate at which device 10 can respond to momentary antenna degradation events.

Figure 8:
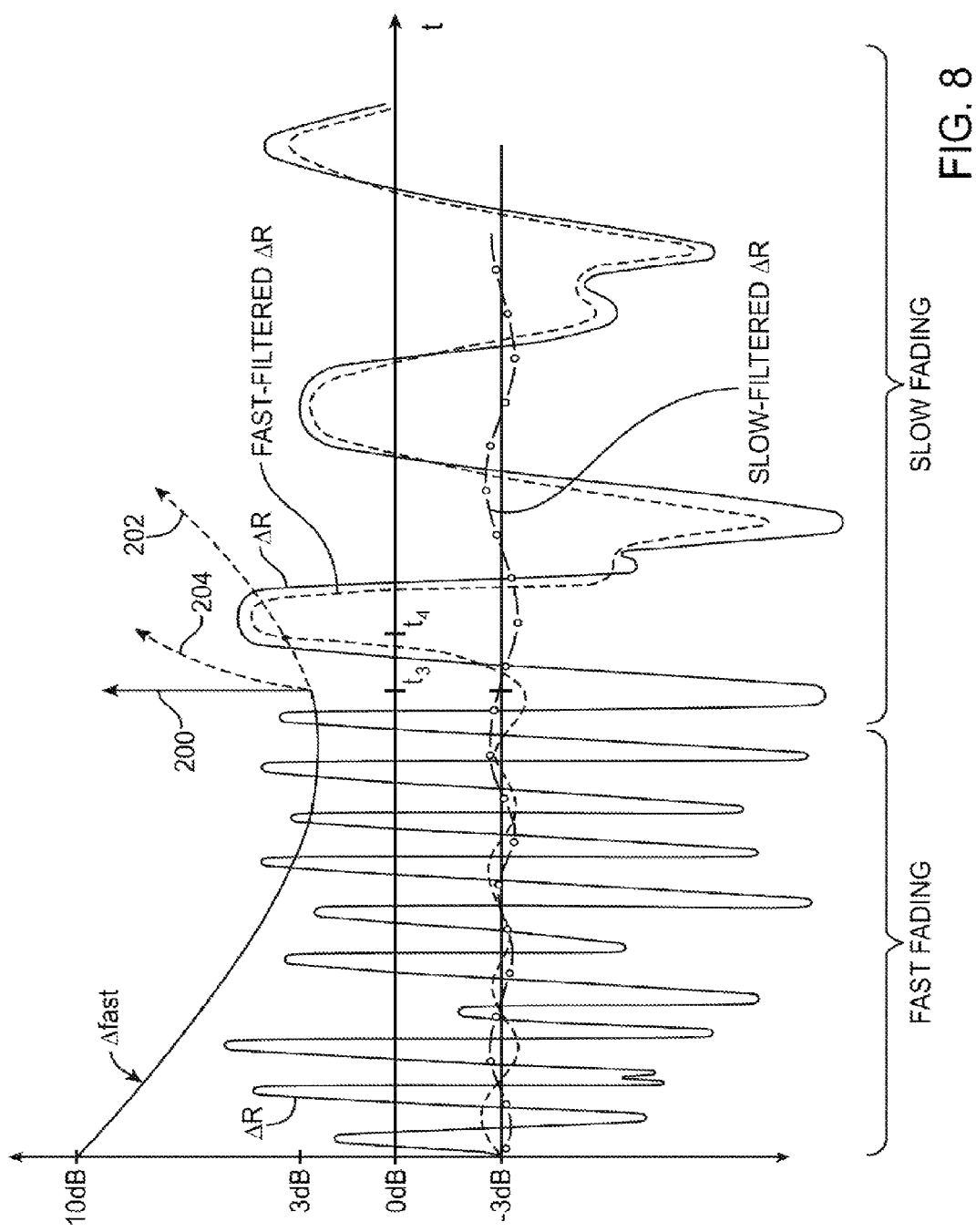
FIG. 8 is a graph showing how antenna switching criteria may be adjusted based on external input such as movement data from a satellite positioning system receiver or a sensor in accordance with an embodiment of the present invention.

FIG. 8 illustrates the performance of device 10 in a scenario in which device 10 is initially operated in a fast fading environment and is subsequently operated in a slow fading environment. This type of scenario may arise, for example, when a user is using device 10 in a moving automobile that stops (at time t3). During operation in the fast-fading environment, Δfast is adaptively reduced from its default value of 10 dB to its minimum value of 3 dB.

At time t3, the environment in which device 10 is operating changes from a fast fading environment to a slow fading environment. Device 10 can detect this change in operating environment at time t3 using GPS data, accelerometer data, or other external input. In response, device 10 can increase Δfast to prevent false alarms (i.e., inappropriate antenna triggering requests due to situations in which fast-filtered ΔR exceeds the reduced 3 dB Δfast threshold). As shown by line 200, for example, Δfast may be immediately restored to its default value of 10 dB at time t3. As shown by line 202, Δfast may, if desired, be restored gradually (without feedback from input 116). Another possibility, which is illustrated by line 204 involves increasing the speed at which Δfast is restored to an appropriate level beyond the relatively slow speed of line 202. Line 204 may correspond to a scheme in which the speed of computing variation V is momentarily increased in response to detection of the transition between the fast fading and slow fading regimes. In the FIG. 8 example, use of the threshold adaptation scheme associated with line 202 may result in an undesired antenna switching event at time t4. This can be avoided by using an accelerated adoption scheme such as the scheme associated with line 200 or the scheme associated with line 204.

If desired, an optional timer operation may be incorporated into the control algorithm. Using a timer, the control algorithm on device 10 may impose a requirement for antenna switching that a particular threshold condition be met a certain number of tines pet unit time. The timer may, for example, be incorporated into the slow filter branch of the control algorithm (and/or the fast filter branch of the control algorithm). Using the timer, a tradeoff may be made between the size of the antenna switching threshold such as the size of Δslow for the slow filter branch (or the size of Δfast for the fast filter branch) and the number of times per unit time that the threshold condition must be met. If, for example, the threshold is required to be exceeded 5 times per every 15 ms, then the magnitude of the threshold may be lowered relative to the threshold value that would be used in the absence of the timer. The use of a timer limit that requires the threshold to be exceeded 5 times per every 15 ms is merely illustrative. Other suitable limit values that specify how many times per unit time the threshold must be exceeded before antenna switching operations are performed may be used if desired. Moreover, timer limits or other time-based criteria may be adaptively adjusted in real time (instead of or in addition to making adaptive adjustments to threshold values such as Δslow and Δfast). Optional timing criteria such as these may be applied and adjusted (and optional adaptive adjustments to threshold values such as Δslow and Δfast may be made) during the operations of steps 110 and 112 of FIG. 4

Although the illustrative antenna switching operations of FIG. 4 were described in the context of an arrangement that has two filters with different filtering speeds (e.g., slow and fast), more time-averaging filter branches may be incorporated into the control algorithm if desired. For example, the control algorithm may include three branches with respective slow, medium, and fast filtering characteristics.

The foregoing is merely illustrative of the principles of this invention and various modifications can be made by those skilled in the art without departing from the scope and spirit of the invention.

What is claimed is:

1. An apparatus, comprising:
control circuitry configured to switch a selected one of a first antenna and a second antenna into use for wireless communications traffic for the apparatus;
wherein the control circuitry is configured to cause the apparatus to:
obtain a difference measurement reflecting how much received antenna signal strength differs between the first antenna and the second antenna;
filter the difference measurement;
gather information relating to whether the apparatus is operating in a fast fading environment or a slow fading environment; and
apply antenna switching criteria to the filtered difference measurement to determine whether to switch the first antenna or the second antenna into use for the wireless communications traffic, wherein the antenna switching criteria are based at least in part on the gathered information.

2. The apparatus defined in claim 1, wherein the gathering the information further comprises:
gathering information indicating whether the apparatus is transitioning between a fast fading environment and a slow fading environment.

3. The apparatus defined in claim 1, further comprising:
a satellite positioning system receiver;
wherein the gathering the information comprises producing movement data based at least in part on signals from the satellite positioning system receiver.

4. The apparatus defined in claim 1, further comprising:
an accelerometer;
wherein the gathering the information comprises producing movement data based at least in part on signals from the accelerometer.

5. The apparatus defined in claim 1, wherein the applying the antenna switching criteria comprises comparing the filtered difference measurement to a threshold.

6. The apparatus defined in claim 5, further comprising adjusting the threshold in real time based at least in part on the gathered information.

7. The apparatus defined in claim 6, wherein the adjusting the threshold in real time comprises raising the threshold in response to the gathered information indicating that the apparatus is transitioning from a fast fading environment to a slow fading environment.

8. An apparatus, comprising:
control circuitry configured to switch a selected one of a first antenna and a second antenna into use for wireless communications traffic for the apparatus;
wherein the control circuitry is configured to cause the apparatus to:
obtain a difference measurement reflecting how much received antenna signal strength differs between the first antenna and the second antenna;
filter the difference measurement to produce one or more filtered difference measurements;
determine whether one of the first antenna and the second antenna has a lower maximum transmit power limit than the other of the first antenna and the second antenna; and
apply antenna switching criteria to the filtered difference measurements to determine whether to switch the first antenna or the second antenna into use for the wireless communications traffic, wherein the antenna switching criteria are based at least in part on whether one of the first antenna and the second antenna has a lower maximum transmit power limit.

9. The apparatus defined in claim 8, wherein the applying the antenna switching criteria comprises comparing the filtered difference measurements to a threshold.

10. The apparatus defined in claim 9, further comprising adjusting the threshold in real time based at least in part on information relating to whether the apparatus is operating in a fast fading environment or a slow fading environment.

11. The apparatus defined in claim 8, wherein the filtering the difference measurement comprises applying first and second filters with different filtering speeds to the difference measurement to produce respective first and second filtered difference measurements.

12. The apparatus defined in claim 11, wherein the applying the antenna switching criteria comprises comparing the first filtered difference measurements to a first threshold and comparing the second filtered difference measurements to a second threshold that is different than the first threshold.

13. The apparatus defined in claim 12, wherein the control circuitry is further configured to cause the apparatus to adjust the second threshold in real time.

14. The apparatus defined in claim 13, wherein the control circuitry is further configured to cause the apparatus to compute how much variation is exhibited between the first filtered difference measurements and the second filtered difference measurements, wherein adjusting the second threshold comprises adjusting the second threshold in response to the computed variation.

15. A non-transitory computer readable medium comprising software instructions executable by a processor of an apparatus, the software instructions configured to cause the apparatus to:
 obtain a difference measurement reflecting how much received antenna signal strength differs between a first antenna and a second antenna;
 filter the difference measurement to produce one or more filtered difference measurements;
 determine whether one of the first antenna and the second antenna has a lower maximum transmit power limit than the other of the first antenna and the second antenna; and
 apply antenna switching criteria to the filtered difference measurements to determine whether to switch the first antenna or the second antenna into use for wireless communications traffic, wherein the antenna switching criteria are based at least in part on whether one of the first antenna and the second antenna has a lower maximum transmit power limit.

16. The non-transitory computer readable medium defined in claim 15, wherein the applying the antenna switching criteria comprises comparing the filtered difference measurements to a threshold.

17. The non-transitory computer readable medium defined in claim 16, wherein the software instructions are further configured to cause the apparatus to:
 adjust the threshold in real time based at least in part on information relating to whether the apparatus is operating in a fast fading environment or a slow fading environment.

18. The non-transitory computer readable medium defined in claim 15, wherein the filtering the difference measurement comprises applying first and second filters with different filtering speeds to the difference measurement to produce respective first and second filtered difference measurements.

19. The non-transitory computer readable medium defined in claim 18, wherein the applying the antenna switching criteria comprises comparing the first filtered difference measurements to a first threshold and comparing the second filtered difference measurements to a second threshold that is different than the first threshold.

20. The non-transitory computer readable medium defined in claim 19, wherein the software instructions are further configured to cause the apparatus to adjust the second threshold in real time.

* * * * *